United States Patent Office 3,436,539
Patented Apr. 1, 1969

3,436,539
DIRECTIONAL AND RANGING SYSTEM EMPLOYING RADIATION DETECTORS
George E. Wilcox, Doylestown, Pa., assignor to the United States of America as represented by the Secretary of the Navy
Filed Dec. 27, 1965, Ser. No. 516,792
Int. Cl. G01t 1/16
U.S. Cl. 250—83.3                                    7 Claims

ABSTRACT OF THE DISCLOSURE

Apparatus for ascertaining the bearing and range of a known, remotely located radiation source having three scintillation crystal type radiation detectors arranged in a triangular configuration and having shielding interposed therebetween which is appropriately shaped for controlling the bearing responsive output signals of three associated photomultiplier tubes which are connected to a multichannel signal processor which, in turn, is connected both to a three-wire magnetic compass indicator for indicating the bearing of the radiation source and to a voltmeter for indicating the range of the radiation source.

---

The invention described herein may be manufactured and used by or for the Government of the United States of America for governmental purposes without the payment of any royalties thereon or therefor.

The present invention relates to a detecting system for determining azimuth, range, and elevation and more particularly to a detecting system employing nuclear techniques and capable of providing an all-weather guidance systems for formation control and blind landing.

Nearly all modern military and commercial aircraft and vessels have all-weather capability for determining range and bearing with relation to other objects, stationary or moving, beyond a distance of 1000 feet. Infrared devices aid in guiding missiles to their targets by homing on sources of heat. Sonic detectors guide torpedoes to vessels through the use of sound waves. Laser signals have been bounced off the moon, and could probably be used for guidance at such distances. Space probes can be guided accurately to Mars and beyond by the use of horizon sensors and star seekers.

All existing guidance systems fail, however, at distances from 1000 feet down to 0 (contact), under adverse weather conditions, darkness and low altitude. Yet it is in this area that the most critical problem, i.e., the danger of collision or crash, occurs every day. A classic example is the inability to land a plane at a fog-shrouded airport; another is the collison of two vessels in a blinding snow storm, although fully equipped with radar, horns and lights; a third is the all too frequent loss of helicopters and their crews, both in training and in tactical operations because of collisions in clouds or heavy rain.

Signals in nearly all regions of the electromagnetic spectrum encounter severe obstacles in all-weather day and night operations at short range. Darkness, clouds and ground fog make visual and optical methods undependable; the varying density of smoke and moisture, as well as spurious heat signals from the sun and other sources, degrade infrared; lasers require extremely stable conditions and suffer atmospheric attenuation; sonics and ultrasonics suffer from local noise, low propagation velocity, and absorption and distortion due to the atmosphere; microwave and radar techniques have not yet been extended to ranges less than 1000 feet or accuracies of less than 200 feet, and at low altitudes suffer from ground clutter and other interference.

The present invention avoids the difficulties enumerated above by the use of gamma radiation in the detection of objects and the determination of the range, azimuth and elevation of the objects so detected thereby enhancing the use of the invention as a short range, all-weather guidance system.

It is an object of the present invention to provide a system for detecting an object or objects and for determining the range, azimuth and elevation thereof.

Anther object of the present invention is to provide a detecting system employing radiation techniques for determining the range, elevation and azimuth of an object or objects.

Still another object of the present invention is to provide a detecting system which does not interfere with and is not affected by electronic equipment, is essentially nonjammable and nondectable beyond the design range, and which utilizes a signal which undergoes negligible attenuation during propagation through an atmosphere varying in density, temperature and pressure.

Still another object of the present invention is to provide a detecting system employing nuclear techniques having no motional scanning or physical motion of any sort in the detector operation and having a virtual absence of heavy shielding or collimating material at the detector.

Still a further object of the present invention is to provide a detecting system which is compact, simple, lightweight and inexpensive and one which will provide accurate information as to range, azimuth, and elevation under all conditions of weather and in darkness thereby providing an all-weather guidance system for formation control and blind landing.

Various other objects and advantages will appear from the following description of an embodiment of the invention and novel features will be particularly pointed out hereinafter in connection with the appended claims.

Figure 1:
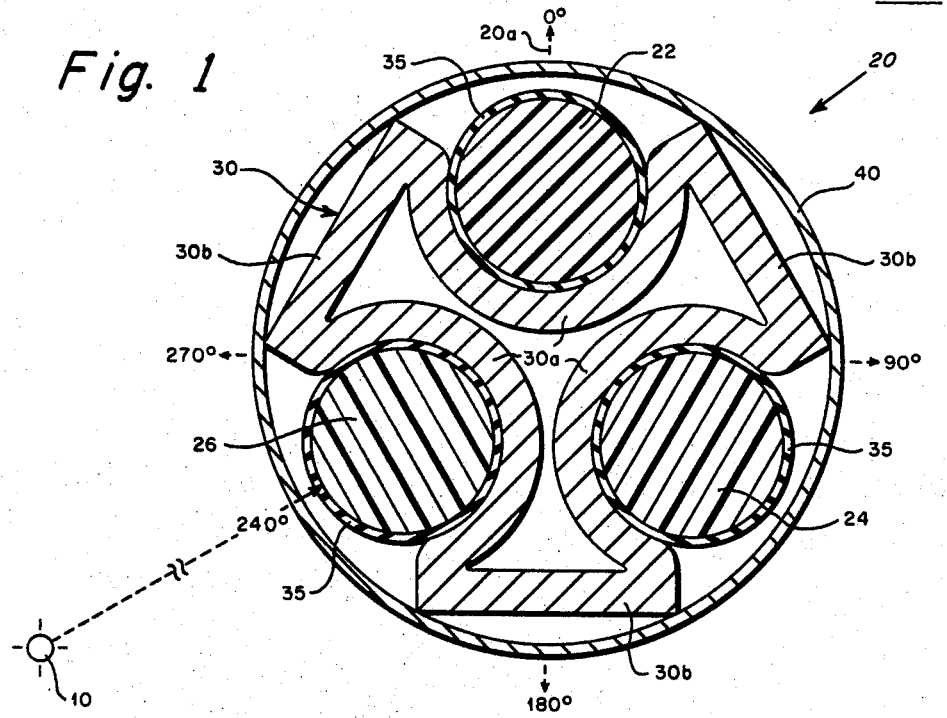
FIG. 1 illustrates a cross sectional view of the static multidetector array together with a schematic representation of the nuclear radiation source.

In the illustrated embodiment of the invention and with particular reference to FIG. 1, a known, unshielded omnidirectional radio-active source or transmitting beacon indicated at 10 is schematically represented and is located on or at the object to be detected. Radio-active source 10 may be cobalt 60, a readily available gamma emitter with two distinctive responsive peaks of high energy and a half life of 5.3 years which provides a stable source of gamma rays. The object to which or in which the source is affixed may be a landing field, a fixed wing aircraft, a helicopter, a water vehicle, etc. In the instance where the invention is used as a guidance system, the source or transmitting beacon 10 is placed in the tail of the leading helicopter and is encased within a shield having a plug and equipped with a withdrawing mechanism for removing the source from the shield. It is contemplated that a control switch in the pilot's compartment energizes the mechanism that withdraws the shield plug, with the source attached, until the source is totally exposed. A small shadow shield located forward of the source protects crew and passengers, while allowing omnidirectional propagation of the gamma signal.

Detecting apparatus generally noted at 20, and taking tht form of a multidetector array, is located remote from the source or beacon 10 and at a detecting station. The detecting station also may be a landing field, boat, adjacent fixed wing aircraft or helicopter. When the detection system is used as a guidance system, the helicopters, not shown, that follow the beacon 10 have the multidetector array or detector 20 mounted in a small radome or other convenient, unobstructed location.

The detector 20 consists of three scintillation crystals 22, 24 and 26 of sodium iodide or the like and having a dimensional configuration of, for example, one inch in diameter by two inches in length. These scintillation crystals 22, 24 and 26 are optically coupled in a manner known and used in the art to three photomultiplier tubes (PMT), schematically illustrated in FIGURE 3.

The crystals 22, 24 and 26 are maintained in a triangular array, 120° apart, by a shaped lead shield generally indicated at 30. The shield 30 is shaped and the thickness determined so as to obtain a linear relationship such that each degree of bearing is equivalent to a degree on the indicator or readout 80 discussed below. The shield 30 only partially surrounds each of the crystals 22, 24 and 26 thereby leaving corresponding exposed surfaces.

In order to space the crystals 22, 24 and 26 from the lead shield 30 and thereby preclude inadvertent breakage thereof due to impact with the lead shield 30, a plurality of rubber O-rings or the like 35 are placed around the crystals 22, 24 and 26. To complete the array 20 the crystals 22, 24 and 26 are tied or otherwise secured in their respective positions within the shaped shield 30 by any appropriate means known in the art and an aluminum case 40 is positioned around the array 20 and encases the same as well as the PMT's not shown.

The static multidetector array 20 is positioned and mounted in the detecting station described above with the cylindrical axes of the crystals in a vertical plane. As will be described below, range and bearing information can thereby be obtained. However, it should be understood at this point that other detector crystals may be mounted with their cylindrical axes in a horizontal plane instead of a vertical plane. This will provide the information required to indicate differences in altitude between the object to be detected and the detecting station and range to the object. In order to simplify the description, however, only the arrangement that obtains range and bearing will be described below it being understood that a similar arrangement placed in a horizontal plane would provide range and altitude information.

Figure 2:
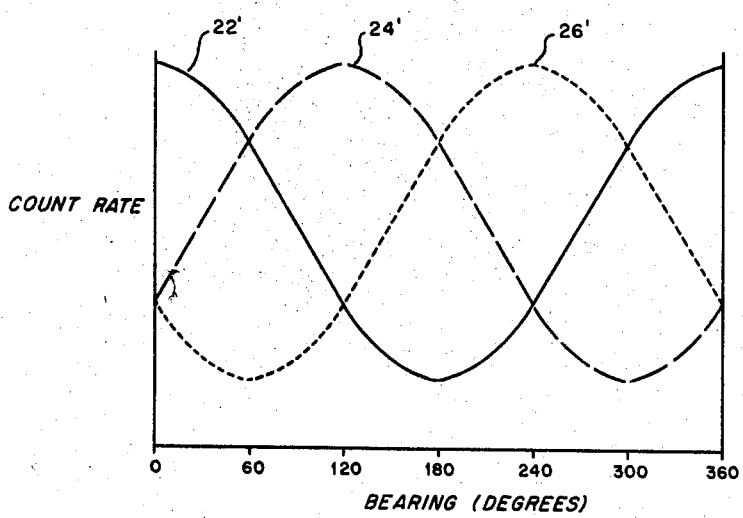
FIG. 2 is a graphical representation of the sinusoidal response of the three detectors of FIG. 1.

FIG. 2 is a graphical representation of the responses of 22', 24' and 26' of the three crystals 22, 24 and 26, respectively, when the radiation count rate received by the crystals is plotted against the bearing or azimuth angle (in degrees) to the source at a given constant range. With reference to FIGS. 1 and 2, it is observed that the 0° line or reference point from which the bearing is to be measured is established at 20a and, therefore, the source 10 is located at a bearing of 240° therefrom. In this position the crystal 26 is unshielded and exposed to the full radiation emitted by source 10. At the same time crystals 22 and 24 are shielded by the lead in the same amount and sense an equal amount of radiation. This relationship is illustrated in FIG. 2 where at a bearing of 240° it is indicated that the count rate obtained from crystal 26 is at a maximum while the count rate obtained from crystals 22 and 24 are less than that received from crystal 26, are not at a minimum, and are equal. It is observed that as the angular relationship between the source and the detector array 20 changes (range-constant) as, for example, the bearing angle comes closer to 360°, the count rate of detector 22 begins to increase since this detector is less shielded while the rate of detector 26 decreases since increased shielding is effected.

The sharp changes or reversals in direction of the curves illustrated in FIG. 2 are obtained through the shaping of the lead shield 30. As viewed in FIG. 1, the lead shield 30 includes three arcs or arcuate segments 30a enveloping approximately 180° of the crystals 22, 24 and 26. Each of these arcuate portions 30a are joined by flat slabs 30b formed at the ends of each arcuate segment.

Figure 3:
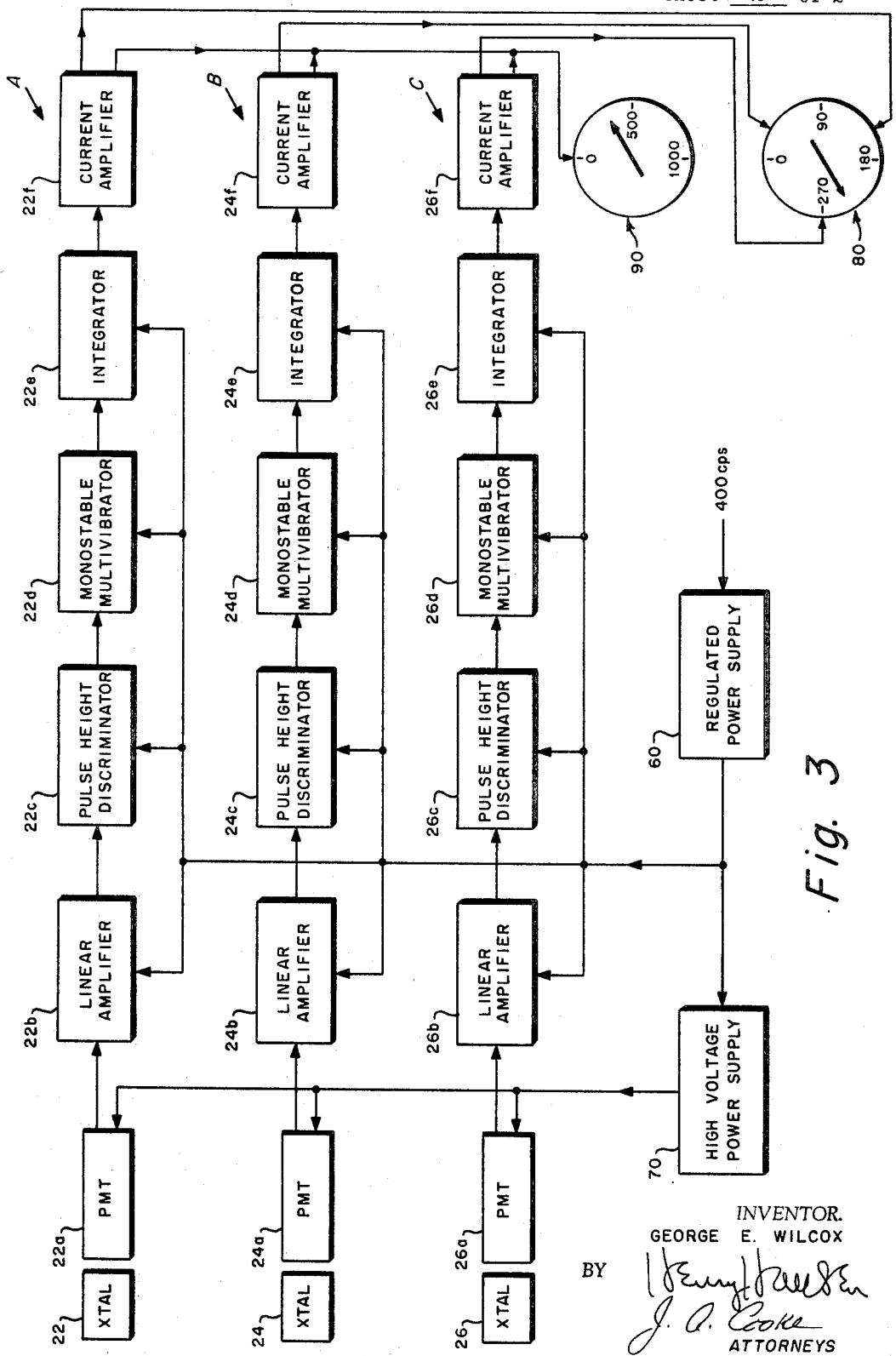
FIG. 3 is a schematic block diagram of the detection system of the present invention.

Referring now to FIG. 3, for an electronic block diagram of the detector system, the detector crystals 22, 24 and 26 are optically coupled, as indicated above, to PMT's 22a, 24a and 26a, respectively, of the type known and used in the art. In the present embodiment a highly regulated 28 v. DC supply, indicated generally at 60, draws approximately a half ampere from the aircraft's 400 c.p.s. power supply and powers the three identical signal processing channels indicated generally at A, B, and C. The output of supply 60 is fed to a high voltage power supply 70 which in turn is electrically coupled to PMT's 22a, 24a, and 26a. In view of the identical nature of the arrangement of the PMT's 22a, 24a and 26a and their associated signal processing channels A, B, and C, respectively, only one such arrangement and channel will be described.

The output of PMT 22a is coupled to a linear amplifier 22b which boosts the signals linearly, the output of which is supplied to a pulse height discriminator 22c. Pulse height discriminator 22c is electrically connected to a monostable multivibrator 22d, the output of which is fed to an integrator 22e. The signal from integrator 22e is fed to current amplifier 22f, the D.C. output signal of which together with the output signals from current amplifiers 24f and 26f being connected to the three taps, 120 magnetic degrees apart, of the winding of a magnetic compass indicator 80 of a type known and used in the art. This obtains bearing information. The sum of the three signals obtained from the three channels A, B, and C is additionally connected to a multivibrator generally indicated at 90, and also of the type known and used in the art, which is calibrated in feet. This obtains range information. Therefore it is seen that the combination crystal-PMT arrangements: 22–22a; 24–24a; and 26–26a sense the radiation of the gamma source 10 and produce a count rate which is proportional to the rate of disintegration of the source which is a known rate for any isotope and is proportional to the inverse square of the distance from the gamma ray source. These count rates are converted by the circuits, described below, to impulses or signals of corresponding value or magnitude to the quantitative count received by the combination crystal-PMT arrangements.

The operation of the device is as follows: gamma rays from the source or beacon 10 may pass to one crystal such as 26, unobstructed, but must pass through some amount of shielding to reach the other crystals 22 and 24. The orientation of the crystals 22, 24 and 26 with respect to the incoming rays defines the thickness of lead and amount of signal attentuation. A fixed portion of the gamma rays entering each crystal is converted to light scintillations. These photons impinge on the PMT cathode and cause the flow of electrons which are multipled in the PMT's 22a, 24a and 26a. Each output signal of the PMT is first amplified by the linear amplifier into pulses of typically 4 v. D.C. at 1 microsecond, and further amplified and shaped into squared pulses of perhaps 22 v. D.C. with a 12-microsecond duration. A discriminator 22c selects the baseline below which pulses are not accepted, thus assuring a good signal-to-noise ratio and supplies output pulses only over a certain voltage or energy level. The multivibrator 22d is triggered by each pulse received from discriminator 22c and the output signal thereof is fed to the integrator 22e which in turn provides a D.C. voltage output which is a function of the input pulse rate frequency. The amplifier 22f amplifies this signal and supplies the same to one winding of the magnetic compass indicator 80. Similarly, the output of channels B and C are simultaneously fed to the other field coils of the magnetic compass 80 and the indicator needle thereof assumes a position in the line with the vectorial sum of the three fields, which provides an accurate measure of the direction from which the gamma rays emanate. The algebraic sum of the three signals provides a measure of the total signal intensity from a source of known strength and thus becomes an indication of the distance to the source. The sum of the three signals is applied to the indicator 90 for direct visual readout.

It will be understood that various changes in the details, materials, steps and arrangement of parts, which have been herein described and illustrated in order to explain the nature of the invention, may be made by those skilled in the art within the principle and scope of the invention as expressed in the appended claims.

What is claimed is:

1. In a system for providing an indication of the location of a remotely located source of radiation, apparatus comprising:
    detector means including at least three radiation detectors positioned in a symmetrical array and each providing a detector output signal in response to radiation;
    radiation shielding means forming for said detectors equiangularly displaced viewing planes, said shielding means being shaped and positioned adjacent said detectors for progressively attenuating by the same degree the impinging radiation at each detector as a function of the deviation of the radiation source measured from the respective said viewing planes; and
    indicating means connected to said detector means for receiving said detector means output signals and including means for deriving the vectorial sum of said output signals and continually indicating the bearing of the remotely located source of radiation.

2. Apparatus according to claim 1 wherein:
    said shielding means is shaped and positioned relative to said detectors for causing said detector means to provide detector means output signals each symmetrically displaced in phase as a function of bearing and each varying sinusoidally relative to an average count rate as a function of bearing.

3. Apparatus according to claim 1 wherein:
    said detectors are positioned in a generally circular array; and
    said shielding means extends generally radially outwardly of the center of said circular array between adjacent detectors and includes a plurality of slab portions each transversely extending outwardly of and partially across a respective pair of said adjacent detectors.

4. Apparatus according to claim 3 wherein:
    said shielding means includes portions conforming in shape to the adjacent peripheries of said detectors which peripheries confront the center of said array.

5. Apparatus according to claim 4 wherein:
    said detectors generally have cylindrical configurations and parallel axes; and
    said conforming portions of said shielding means generally have cross sectional configuration of arcs of circles, said slab portions of said shielding means extending between confronting adjacent ends of said conforming portions.

6. Apparatus according to claim 5 wherein:
    the number of said detectors is three and said detector means further comprises signal processing means including three substantially identical channels each connected to receive said detector output signal from a respective detector and each providing a channel output signal equivalent to the integration of said respective detector output signal; and
    said indicating means includes a compass indicator having three input terminals each connected to receive a respective channel output signal for providing a bearing indication equivalent to the direction of the vectorial sum of said channel output signals.

7. Apparatus according to claim 6 further comprising:
    range indicating means calibrated for the source of radiation having a known disintegration rate and connected to said signal processing channels and responsive to the algebraic sum of said channel output signals for providing an indication of the range of the radiation source from the array.

References Cited

UNITED STATES PATENTS

| 3,047,721 | 7/1962 | Folsom et al. | 250—71.5 X |
| 3,051,942 | 8/1962 | Galman | 318—20.340 |
| 3,167,652 | 1/1965 | Weisbirch | 250—71.5 |
| 3,243,147 | 3/1966 | Brown et al. | 250—83.3 |
| 3,265,904 | 8/1966 | Spencer | 318—20.340 X |
| 3,293,440 | 12/1966 | Mueller | 250—203 |
| 3,363,100 | 1/1968 | Cohen et al. | 250—71.5 |

RALPH G. NILSON, *Primary Examiner.*

MORTON J. FROME, *Assistant Examiner.*

U.S. Cl. X.R.

250—71.5; 318—20.340